US006711908B2

(12) United States Patent
Ferragut, II et al.

(10) Patent No.: US 6,711,908 B2
(45) Date of Patent: Mar. 30, 2004

(54) REFRIGERATOR HAVING POWER OUTAGE DURATION FEATURE

(75) Inventors: Nelson J. Ferragut, II, Williamsburg, IA (US); John L. McNamara, Coralville, IA (US); Louis Montuoro, Cedar Rapids, IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 10/195,787

(22) Filed: Jul. 15, 2002

(65) Prior Publication Data

US 2003/0010045 A1 Jan. 16, 2003

Related U.S. Application Data

(60) Provisional application No. 60/305,766, filed on Jul. 16, 2001.

(51) Int. Cl.$^{7}$ .......................... F25B 1/00; G01K 13/00

(52) U.S. Cl. .......................... 62/129; 62/230; 340/652; 368/121

(58) Field of Search .................. 62/129, 230; 368/121, 368/113; 713/340; 340/635, 652, 656, 691.6

(56) References Cited

U.S. PATENT DOCUMENTS

| | | | | |
|---|---|---|---|---|
| 3,234,533 A | | 2/1966 | Poli | |
| 4,109,235 A | | 8/1978 | Bouthors | |
| 4,148,194 A | | 4/1979 | Kells | |
| 4,387,578 A | | 6/1983 | Paddock | |
| 4,404,813 A | | 9/1983 | Paddock et al. | |
| 4,411,139 A | | 10/1983 | Bos | |
| 4,466,074 A | * | 8/1984 | Jindrick et al. | 364/569 |
| 4,490,986 A | | 1/1985 | Paddock | |
| 4,573,325 A | | 3/1986 | Chiu et al. | |
| 4,584,651 A | * | 4/1986 | Carey, Jr. et al. | 364/483 |
| 4,652,139 A | | 3/1987 | Sulcer, Jr. | |
| 4,966,004 A | | 10/1990 | Midlang et al. | |
| 5,262,758 A | | 11/1993 | Nam et al. | |
| 5,623,836 A | | 4/1997 | Mrozinsky et al. | |
| 5,684,710 A | * | 11/1997 | Ehlers et al. | 364/492 |
| 5,774,425 A | | 6/1998 | Ivanov et al. | |
| 5,825,648 A | * | 10/1998 | Karnowski | 364/187 |
| 5,877,676 A | | 3/1999 | Shankarappa | |
| 6,026,495 A | * | 2/2000 | Lacombe et al. | 713/340 |
| 6,119,471 A | | 9/2000 | Tanaka et al. | |
| 6,229,450 B1 | * | 5/2001 | Malmsten | 340/652 |
| 6,343,477 B1 | | 2/2002 | Mandel et al. | |
| 6,593,766 B1 | * | 7/2003 | Aisa | 324/771 |
| 2002/0024332 A1 | * | 2/2002 | Gardner | 324/103 R |

FOREIGN PATENT DOCUMENTS

| | | |
|---|---|---|
| DE | 3819 134 A1 | 12/1989 |
| EP | 0 241 648 A2 | 10/1987 |

* cited by examiner

*Primary Examiner*—Marc Norman
(74) *Attorney, Agent, or Firm*—McKee, Voorhees & Sease, P.L.C.

(57) ABSTRACT

Methods and apparatus for monitoring power outages in a household appliance such as a refrigerator are disclosed. According to the method, a household appliance determines a prior occurrence of a power outage to the appliance. The household appliance then computes a duration of the power outage. Further, the household appliance alerts a user of the duration of the power outage.

16 Claims, 2 Drawing Sheets

REFRIGERATOR HAVING POWER OUTAGE DURATION FEATURE

CROSS-REFERENCE TO RELATED APPLICATIONS

This application claims priority to provisional application U.S. Serial No. 60/305,766 filed on Jul. 16, 2001.

BACKGROUND OF THE INVENTION

This invention relates to a method and apparatus for a household appliance such as, but not limited to a refrigerator. More specifically, this invention relates to such an appliance being able to monitor power outage duration.

Refrigerating appliances such as refrigerators, freezers, and related appliances require electrical power for refrigeration. For example, electrical power can be used for powering a compressor for compressing a refrigerant, an evaporator for generating cool air and/or a refrigerating fan for discharging cool air, or otherwise using external power to refrigerate. When this external power is interrupted such as during a power outage, refrigeration ceases. If the power outage is sufficiently long in duration, the contents of the refrigerator, typically food, can spoil.

Thus, if an individual is aware that a power outage has occurred, an individual is suspect of the food in the refrigerator and its fitness for consumption. If only a very short power outage has occurred, then there is no real cause for concern. However, if a power outage of sufficient duration has occurred, an individual may find it desirable to discard food from the refrigerator and/or otherwise avoid consuming it. Problems relating to power outages can occur in other types of household appliances as well.

Unfortunately, an individual may not be able to tell that a power outage has occurred or the duration of that power outage.

Thus, it is a primary object of the present invention to provide a method and apparatus for a household appliance that improves over the state of the art.

It is a further object of the present invention to provide a household appliance capable of automatically determining that a power outage has occurred.

Yet another object of the present invention is to provide a method and apparatus for a household appliance that determines the duration of a power outage.

Still another object of the present invention is to provide a method and apparatus for a household appliance that is capable of discerning that multiple power outages have occurred.

Yet another object of the present invention is to provide a method and apparatus for a household appliance that alerts a user that a power outage has occurred.

Another object of the present invention is to provide a method and apparatus for a household appliance that requires an acknowledgement from the user that the user acknowledges that a power outage has occurred.

These and other objects, features, or advantages of the present invention will become apparent from the specification and claims that follow.

SUMMARY OF THE INVENTION

The present invention is a method and apparatus for monitoring of power outages in a household appliance such as a refrigerator. The household appliance determines that a power outage has previously occurred. The household appliance then determines the duration of the power outage. The household appliance then alerts a user of the duration of the power outage.

One methodology of the present invention includes periodically storing a time. A current time is compared to a previously stored time. Based on this comparison, the duration of a power outage can be determined, as the current time is maintained but the times are not stored during power outages. Thus, upon reset after a power outage, the current time can be compared to the last stored time in order to determine the occurrence and duration of a power outage.

A refrigerating appliance according to one aspect of the present invention includes a refrigeration system, an external power source operatively connected to the refrigeration system and an intelligent control operatively connected to the external power source. A clock is operatively connected to the intelligent control and a second power source is electrically connected to the clock such that the clock is operable during a power outage of the external power source. The intelligent control is adapted for determining the duration of the power outage.

According to another aspect, the present invention provides for determining if more than one power outage has occurred, as well as determining the time and duration of each power outage or a total duration for multiple power outages.

DETAILED DESCRIPTION OF THE INVENTION

Figure 1:
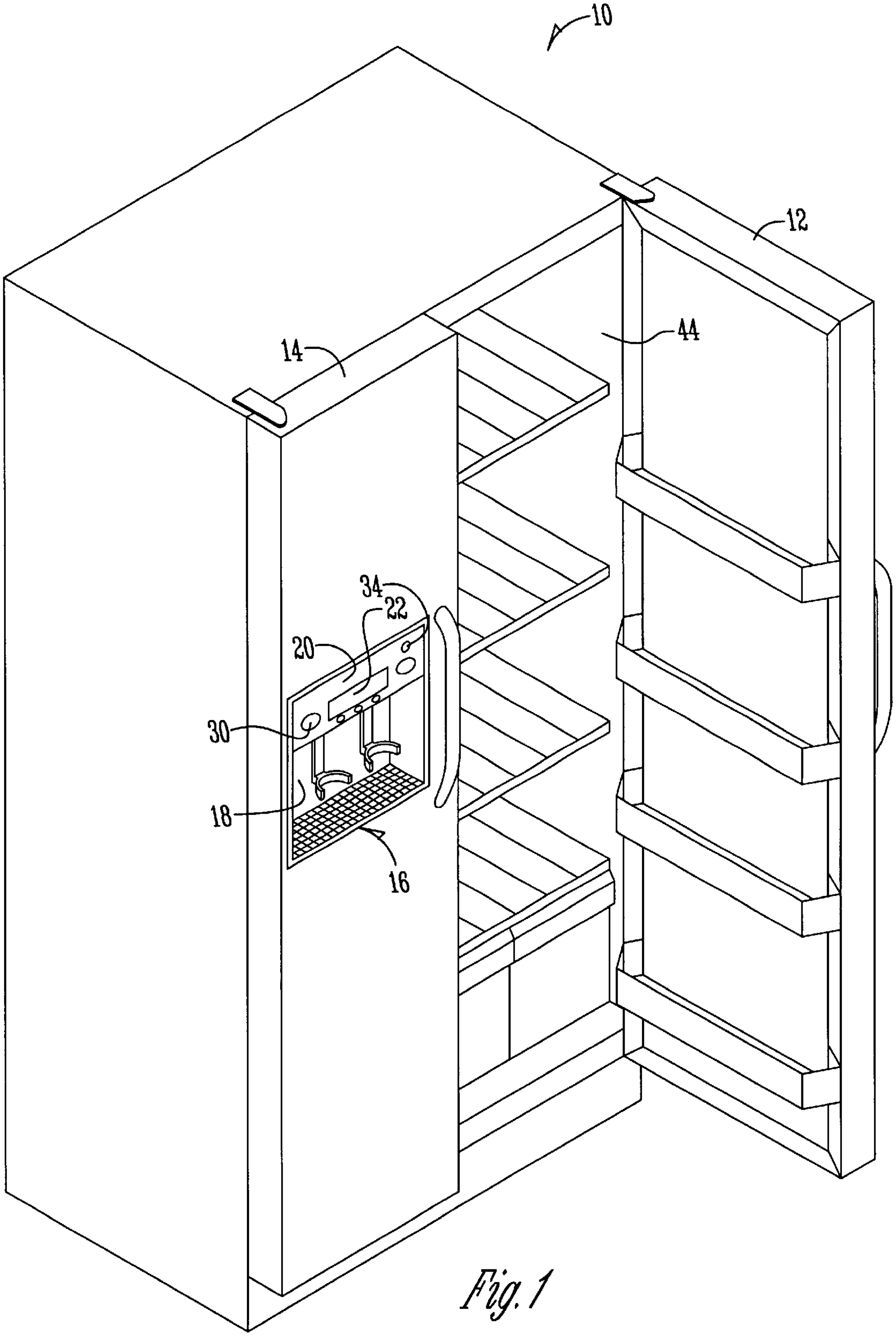
FIG. 1 illustrates an exemplary refrigerator having a display portion for displaying the duration of a power outage effecting the refrigerator.

FIG. 1 illustrates a refrigerator 10 having a side-by-side configuration. In a side-by-side configuration, the refrigerator 10 includes two refrigerating compartments, one being a refrigerator compartment, the second being a freezer compartment. There is a door 12 to the refrigeration compartment and a door 14 provides access to the freezer compartment. The freezer compartment door 14 may contain a water and ice dispenser, generally shown at 16. In addition, the water and ice dispenser 16 includes a lower receptacle 18 for receiving cups and dispensing water and ice therein. Above the receptacle 18 is a user interface 20 that is used to communicate power outage information.

Figure 2:
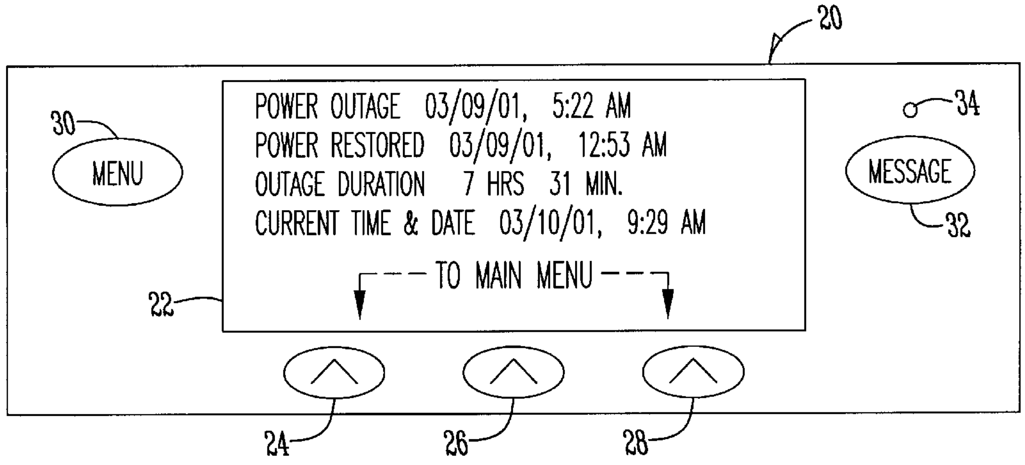
FIG. 2 is a pictorial representation of a user interface according to the present invention.

FIG. 2 illustrates the user interface 20 in greater detail to include a central panel display 22 that is preferably a graphic liquid crystal display. Three selection buttons 24, 26, 28 are located along the lower edge of the display 22. A menu button 30 is located to the left of the display 22, and a message button 32 is located to the right of the display 22. An LED 34 is positioned directly above the message button 32.

In a normal or standard mode (not shown) wherein there has been no power outage, the display 22 may indicate which of the buttons 24, 26, 28 may be pressed to obtain water, cubed ice or crushed ice in the receptacle 18 of the water and ice dispenser 16. However, where there has been an interruption of external power and then external power has been restored to the refrigerator 10, the display 22 displays messages indicating the time and date of the last power outage, the time and date when the power was restored, the duration of the power outage, and the current time and date. Where multiple power outages have occurred, the time and duration of each power outage can be displayed and/or the accumulated total of the duration of each power outage.

Thus, after a power outage has occurred, power outage information is displayed to alert a user that a power outage has occurred. Further, the user is alerted of the duration of the power outage. Based on the duration of the power outage, the user can then make an informed decision as to whether or not the contents of the refrigerator are unaffected by the power outage or whether there is some likelihood that the contents of the refrigerator were spoiled or otherwise rendered undesirable by the power outage.

Figure 3:
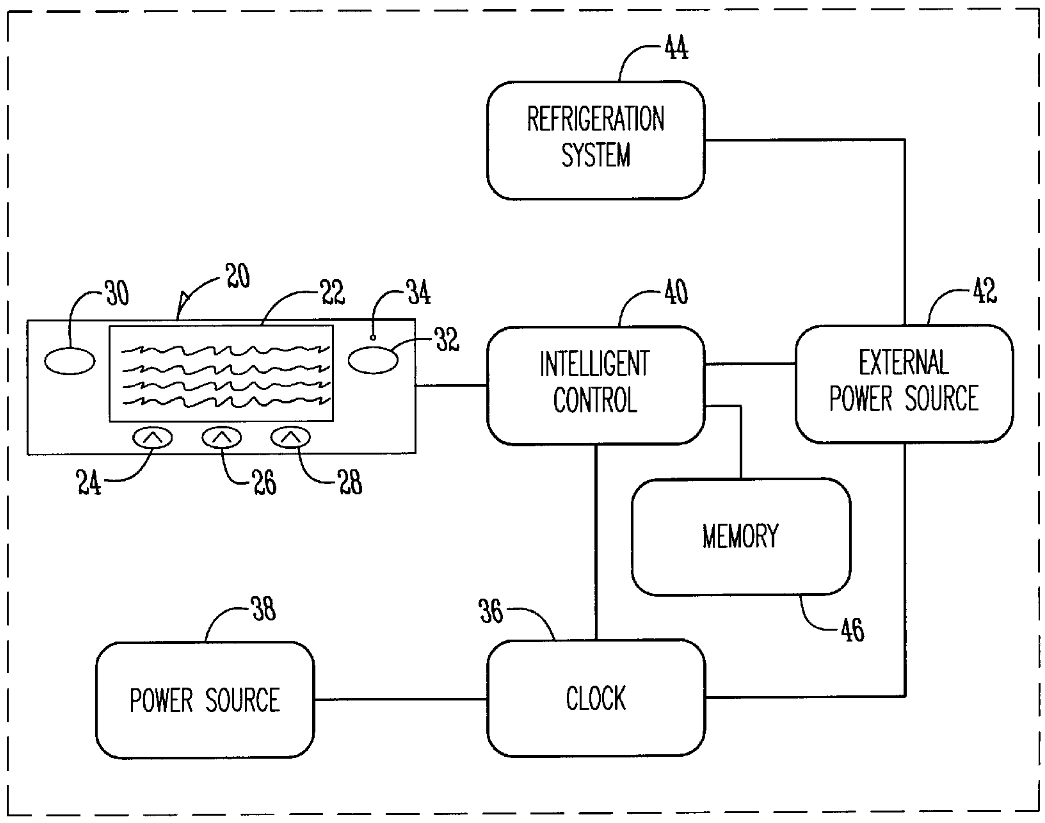
FIG. 3 is a block diagram of a refrigerating appliance according to one embodiment of the present invention.

FIG. 3 illustrates one embodiment of a system according to the present invention. In FIG. 3, the user interface 20 is operatively connected to an intelligent control 40. The intelligent control 40 may be one or more microcontrollers, processors, microcomputers, integrated circuits, a portion of an integrated circuit, electronic control circuit, or other type of intelligent control. The intelligent control 40 is also electrically connected to a clock 36. The clock 36 is preferably a real time clock.

An external power source 42 is used to power the system of the present invention including the refrigeration system 44. In addition, a power source 38 is used to provide power to the clock 36. When there is an interruption in the external power source 42 and a resulting power outage, the power source 38 continues to power the clock 36. The power source 38 may be a super capacitor of a type known in the art. Alternatively, the power source 38 can be a battery or other power source that functions independently of the external power source 42. Preferably, the power source 38 is charged or recharged by the external power source 42 while the refrigerator 10 is operating normally. When the external power source 42 is lost, the power source 38 powers the clock 36. Preferably, the power source 38 functions as a backup power source that is only needed during times of power outage.

The user interface 20 that is operatively connected to the intelligent control 40 includes the display 22 as well as one or more inputs. The inputs can be used for receiving a user acknowledgement of a power outage. After a power outage has occurred, a duration of one or more power outages can be displayed on the display 22. Then a user can be instructed to press one or more buttons or to otherwise actively acknowledge that the power outage message has been received by the user.

The intelligent control 40 is also operatively connected to a memory 46. The memory 46 is preferably a nonvolatile memory. The present invention contemplates that the memory 46 may be internal to the intelligent control 40. The memory 46 is used to store time information. For example, the memory 46 can contain prior times during which the refrigerating appliance was in operation and/or one or more durations of a power outage. Where the memory 46 contains a prior time, the intelligent control 40 can determine or compute a duration of the power outage when the intelligent control 40 also uses a current time from the clock 36. Such a computation can occur upon reset of the intelligent control 40, such as would happen when a power outage of the external power source 42 results in turning the intelligent control 40 off, and the restoration of power through the external power source 42 results in turning on the intelligent control 40. Upon the experience of this reset condition, the intelligent control 40 then checks the last stored time in the memory 46 and compares this prior time to a current time from the clock 36. Comparison of these times allows the intelligent control 40 to determine if a power outage has occurred. If a power outage has occurred this allows the intelligent control to determine the duration of the power outage by determining the difference in time between a stored prior time and the current time. The present invention also contemplates that more than one power outage can be determined by recording the last time before each power outage and storing the then current time once the power outage has been restored. Thus, in this manner multiple power outages can be recorded and their respective durations can be determined. The present invention also provides for the intelligent control 40 being adapted to add or otherwise cumulate multiple power outages so that a total power outage duration can be calculated and displayed. Each of these times can also include a date, so that even extended periods of power outages can be determined.

The present invention contemplates use in any number of household appliances, including, without limitation, refrigerators, dishwashers, laundry appliances, and other types of household appliances.

Thus, a power outage duration feature has been disclosed. The present invention contemplates variations in the parts and components used, the specific computations used, the type of alert used, if any, and other variations within the spirit and scope of the invention.

What is claimed is:

1. A method of monitoring power outages in a household appliance, comprising:

determining by the household appliance of a prior occurrence of a power outage to the appliance;

computing by the household appliance of a duration of the power outage;

alerting a user of the duration of the power outage; and receiving an acknowledgement from the user after alerting the user of the duration of the power outage.

2. The method of claim 1 wherein the household appliance is a refrigerator.

3. The method of claim 1 further comprising periodically storing a time prior to power outage; and wherein the step of computing includes computing by the household appliance of the duration of the power outage using the time prior to power outage.

4. The method of claim 1 wherein the step of alerting includes displaying the duration of the power outage.

5. The method of claim 1 further comprising storing a time prior to the power outage.

6. The method of claim 1 further comprising maintaining a current time during the power outage.

7. A method of monitoring power outages in a household appliance, comprising:

storing a time prior to the power outage;

determining by the household appliance of a prior occurrence of a power outage to the appliance;

computing by the household appliance of a duration of the power outage; and alerting the user of the time prior to the power outage.

8. A method of monitoring power outages in a household appliance, comprising:

periodically storing a time prior to a power outage;

maintaining a current time during the power outage;

determining by the household appliance of a duration of the power outage;

alerting a user of the duration of the power outage; and receiving an acknowledgement from the user after alerting the user of the duration of the power outage.

9. The method of claim 8 further comprising periodically storing a second time prior to a second power outage; maintaining the current time during the second power outage; and determining a second duration associated with the second power outage.

10. The method of claim 9 further comprising cumulating the duration of the power outage and the second duration associated with the second power outage to provide a total power outage duration; and alerting the user of the total power outage duration.

11. The method of claim 8 wherein the household appliance is a refrigerating appliance.

12. A refrigerating appliance, comprising:

a refrigeration system powered by an external power source;

an intelligent control operatively connected to the external power source;

a clock operatively connected to the intelligent control;

a user interface operatively connected to the intelligent control;

a second power source operatively connected to the clock;

the intelligent control adapted for determining a duration of a power outage; and the user interface including an input for receiving a user acknowledgement of the power outage.

13. The refrigeration appliance of claim 12 wherein the user interface includes a display operatively connected to the intelligent control for displaying the duration of the power outage.

14. The refrigerating appliance of claim 12 further comprising a memory electrically connected to the intelligent control for storing time information.

15. The refrigerating appliance of claim 14 wherein the memory is a nonvolatile memory.

16. The refrigerating appliance of claim 12 wherein the intelligent control is further adapted for determining the duration of the power outage from stored time information and from a current time provided by the clock.

* * * * *